United States Patent
Agarwal et al.

(10) Patent No.: US 10,890,920 B2
(45) Date of Patent: Jan. 12, 2021

(54) VEHICLE MAP-DATA GATHERING SYSTEM AND METHOD

(71) Applicant: Aptiv Technologies Limited, St. Michael (BB)

(72) Inventors: Divya Agarwal, Sunnyvale, CA (US); Michael H. Laur, Mission Viejo, CA (US); Brian R. Hilnbrand, Mountain View, CA (US)

(73) Assignee: Aptiv Technologies Limited, St. Michael (BB)

( * ) Notice: Subject to any disclaimer, the term of this patent is extended or adjusted under 35 U.S.C. 154(b) by 364 days.

(21) Appl. No.: 15/906,003

(22) Filed: Feb. 27, 2018

(65) Prior Publication Data

US 2019/0250632 A1    Aug. 15, 2019

Related U.S. Application Data

(60) Provisional application No. 62/631,154, filed on Feb. 15, 2018.

(51) Int. Cl.
*G05D 1/02*  (2020.01)
*G05D 1/00*  (2006.01)
(Continued)

(52) U.S. Cl.
CPC .......... *G05D 1/0274* (2013.01); *G01C 11/00* (2013.01); *G01C 21/32* (2013.01); *G05D 1/0088* (2013.01);
(Continued)

(58) Field of Classification Search
None
See application file for complete search history.

(56) References Cited

U.S. PATENT DOCUMENTS

| 9,079,587 | B1* | 7/2015 | Rupp | B60W 40/06 |
| 2010/0198513 | A1* | 8/2010 | Zeng | G01S 5/0072 701/300 |

(Continued)

FOREIGN PATENT DOCUMENTS

| EP | 2074379 A1 | 7/2009 |
| EP | 3168704 A1 | 5/2017 |
| JP | 2009018621 A * | 1/2009 |

OTHER PUBLICATIONS

Kusaka, Yasushi; Machine Translation of JP-2009018621-A; Jan. 2009; espacenet.com (Year: 2009).*

(Continued)

*Primary Examiner* — David P. Merlino
(74) *Attorney, Agent, or Firm* — Colby Nipper PLLC

(57) ABSTRACT

A map-data collection system for mapping an area includes a first sensor, a receiver, and a controller-circuit. The first-sensor is for installation on a first-vehicle. The first-sensor is configured to gather perception-data of an area from a first-perspective. The receiver is for installation on the first-vehicle. The receiver is configured to receive perception-data gathered by a second-sensor mounted on a second-vehicle proximate to the first-vehicle. The second-sensor is configured to gather perception-data of the area from a second-perspective different from the first-perspective. The controller-circuit is in communication with the first-sensor and the receiver. The controller-circuit is configured to determine composite-data in accordance with the perception-data from the first-sensor on the first-vehicle and the perception-data from the second-sensor on the second-vehicle. Optionally, the first-vehicle may communicate with the second-vehicle in a manner effective to control the relative-position of the first-vehicle and the second-vehicle while the perception-date is being collected.

23 Claims, 3 Drawing Sheets

(51) Int. Cl.
*G01C 21/32* (2006.01)
*G01C 11/00* (2006.01)

(52) U.S. Cl.
CPC ........... *G05D 1/027* (2013.01); *G05D 1/0276* (2013.01); *G05D 1/0253* (2013.01); *G05D 1/0255* (2013.01); *G05D 1/0257* (2013.01); *G05D 1/0287* (2013.01); *G05D 2201/0213* (2013.01)

(56) References Cited

U.S. PATENT DOCUMENTS

| | | | |
|---|---|---|---|
| 2013/0030606 A1* | 1/2013 | Mudalige | G05D 1/0295 701/2 |
| 2018/0023961 A1 | 1/2018 | Fridman | |
| 2019/0069052 A1* | 2/2019 | Al-Stouhi | H04W 4/46 |
| 2019/0086914 A1* | 3/2019 | Yen | G05D 1/0212 |
| 2019/0212746 A1* | 7/2019 | Cheng | B60W 60/001 |
| 2019/0249999 A1* | 8/2019 | Agarwal | B60W 60/001 |

OTHER PUBLICATIONS

European Search Report for Application No. 19157090.2, European Patent Office, dated Jun. 13, 2019.
Jules S Jaffe Ed—Jan Verdaasdonk et al: "Multi Autonomous Underwater Vehicle Optical Imaging for Extended Performance", Oceans 2007—Europe, IEEE, PI, Jun. 1, 2007, pp. 1-4.
"Foreign Office Action", EP Application No. 19157090.2, dated May 20, 2020, 5 pages.

* cited by examiner

VEHICLE MAP-DATA GATHERING SYSTEM AND METHOD

TECHNICAL FIELD OF INVENTION

This disclosure generally relates to a map-data collection system, and more particularly relates to a system that determines composite-data for a digital-map in accordance with perception-data from a first-sensor on a first-vehicle and perception-data from a second-sensor on a second-vehicle.

BRIEF DESCRIPTION OF DRAWINGS

The present invention will now be described, by way of example with reference to the accompanying drawings, in which.

DETAILED DESCRIPTION

Figure 1:
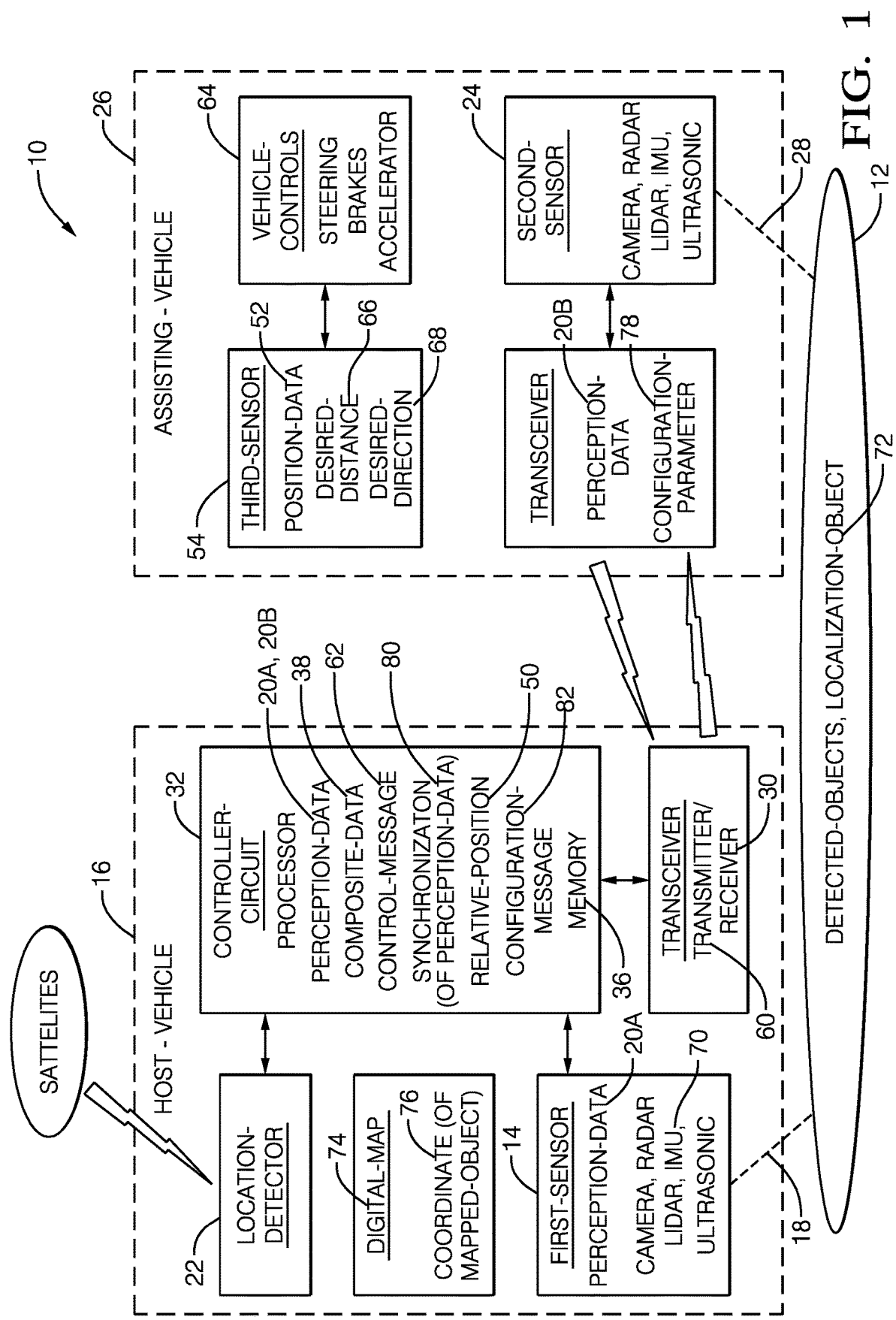
FIG. 1 is diagram of a map-data collection system in accordance with one embodiment.

FIG. 1 illustrates a non-limiting example of a, map-data collection system, hereafter referred to as the system 10, which is generally for mapping an area 12. As used herein, "mapping" means collecting data and information for the purpose of making, forming, updating, and/or modifying a map, e.g. a digital-map, that can be used for navigating vehicles, including autonomous operation of an automated vehicle. Such a map may have various configurations such as, but not limited to, a three-dimensional (3D) model of the area 12 that depicts locations of various objects such as curbs, signs, traffic-signals, barriers, bridges, buildings, safe stop-zones, road/lane markings, and the like. The system 10 described herein is distinguished from prior map-data collection systems because the system 10 combines data from one or more sensors mounted on two or more distinct vehicles that are acting cooperatively to gather data from two or more distinct perspectives, thereby providing an improved auto-stereoscopic view of the area 12 because the sensors on the two or more vehicles are spaced apart further than would be possible if all sensors were mounted on a single vehicle.

The system 10 includes a first-sensor 14 for installation on a first-vehicle 16. The first-sensor 14 may consist of or include, but is not limited to, one or more instances of a camera, radar unit, lidar unit, ultrasonic transducer, inertial measurement unit (IMU), global-positioning-sensor (GPS), or any combination thereof. The devices or units that form the first-sensor 14 may be co-located in a unified housing, or distributed at different advantageous locations about the first-vehicle 16. For example, the first-sensor 14 may include multiple cameras so a 360° image about the first-vehicle 16 can be rendered, i.e. synthesized. The first-vehicle 16 may be a manual-drive or human-driven type of vehicle, a partially-automated (e.g. automated speed control with human operated steering), or a fully-automated or autonomous vehicle that may or may not have an occupant residing within the first-vehicle 16 while the system 10 is mapping. That is, it is contemplated that the first-vehicle 16 may autonomously operate without any immediate direct control by a human to gather data to form a map the area 12.

The first-sensor 14 is generally configured to gather perception-data 20A from the area 12 that may be in the form of, but not limited to, an image or video from a camera, a radar-map from a radar-unit, a point-cloud from a lidar-unit, a measure or indication of vehicle-orientation (roll/pitch/yaw angle) from an inertial-measurement-unit (IMU), or any combination thereof. The first-vehicle 16 may also be equipped with a location-detector 22 that indicates a global-position-system-coordinate (GPS-coordinate, e.g. latitude, longitude, elevation) of the first-vehicle 16 or the first-sensor 14. Based on the GPS-coordinate and the orientation (e.g. compass heading) of the first-vehicle 16 or the first-sensor 14, the perception-data 20A of the area 12 from the first-sensor 14 can be characterized as being gathered (i.e. rendered or taken) from a first-perspective 18.

The system 10 includes a receiver 30 for installation on the first-vehicle 16. The receiver 30 is used or configured to receive perception-data 20B gathered by a second-sensor 24, e.g. camera, radar, lidar, ultrasonic, IMU, coordinate of second-vehicle, any combination thereof. The second-sensor 24 is mounted on a second-vehicle 26. When the system 10 is mapping, the second-vehicle 26 is operating or traveling proximate to (e.g. within 50 meters of) the first-vehicle 16. Preferably, the second-vehicle 26 is fully-automated, i.e. autonomous, but manual operation is an option as will be explained in more detail later. The second-sensor 24 is configured to gather the perception-data 20B of the area 12 from a second-perspective 28 different from the first-perspective 18. As will be explained in more detail later, the first-vehicle 16 and the second-vehicle 26 are cooperatively operated so that the spacing between the first-sensor 14 and the second-sensor 24 is known (and preferable also well-controlled) so that the perception-data 20A gathered by the first-sensor 14 can be advantageously combined with the perception-data 20B gathered by a second-sensor 24.

The system 10 includes a controller-circuit 32, hereafter sometimes referred to as the controller 32, which is in communication with the first-sensor 14 and the receiver 30. It follows that the controller-circuit 32 is also in communication with the second-sensor 24 by way of the receiver 30 and a transmitter or transceiver mounted on the second-vehicle 26. The controller 32 may include a processor 34 such as one or more instances of a microprocessor or other control circuitry such as analog and/or digital control circuitry including an application specific integrated circuit (ASIC) for processing data as should be evident to those in the art. Hereafter, any reference to the controller 32 being configured for something is to also be interpreted as suggesting that the processor 34 may also be configured for the same thing. The controller 32 may include memory 36, i.e. non-transitory computer-readable storage-medium, including non-volatile memory, such as electrically erasable programmable read-only memory (EEPROM) for storing one or more routines, thresholds, and captured data. The memory 36 may be part of the processor 34, or part of the controller 32, or separate from the controller 32 such as remote memory stored in the cloud. The one or more routines may be executed by the controller 32 or the processor 34 to perform steps for processing the perception-data 20A, 20B based on signals received by the controller 32 as described herein.

The controller-circuit 32 is in one respect configured or programmed to determine composite-data 38 in accordance with (i.e. based on) the perception-data 20A from the first-sensor 14 on the first-vehicle 16 and the perception-data 20B from the second-sensor 24 on the second-vehicle 26. That is, the controller 32 (or the processor 34) is configured to combine the perception-data 20A, 20B to make or provide, for example, a 3D model or an improved resolution/accuracy 2D model of the area 12. By way of example and not limitation, improved resolution/accuracy may be realized by: using averaged GPS-coordinates of the first-vehicle 16 and the second-vehicle 26; overlapping of points-clouds from lidar-units in the first-sensor 14 and the second-sensor 24; comparing/combining/averaging of variations in: ground-slope, road-surface-type, road-surface induced shock/vibration reported by the IMUs in the first-sensor 14 and the second-sensor 24.

The composite-data 38 may be determined or synthesized based on time-synchronized perception-data from first-sensor 14 and the second-sensor 24. That is, the perception-data 20A, 20B from the first-sensor 14 and the second-sensor 24 used to determine the composite-data 38 are temporally synchronized. While it is thought to be preferable that, for example, an image from a camera of the first-sensor 14 be rendered or taken at the same instant in time as an image from a camera of the second-sensor 24, this is not a requirement. Alternatively, the images or other types of data from the distinct sensors that were captured or rendered at different instants in time may be combined to provide certain desired perspectives (the first-perspective 18 and the second-perspective 28) of the area 12. For example, multiple images from cameras in the first-sensor 14 and the second-sensor 24 taken at differing instant in time can be processed to form a 3D model of one or more detected-objects present in the images. Accordingly, the perception-data 20A, 20B may include a time-stamp that indicates the instant in time when the perception-data 20A, 20B was gathered.

Figure 2:
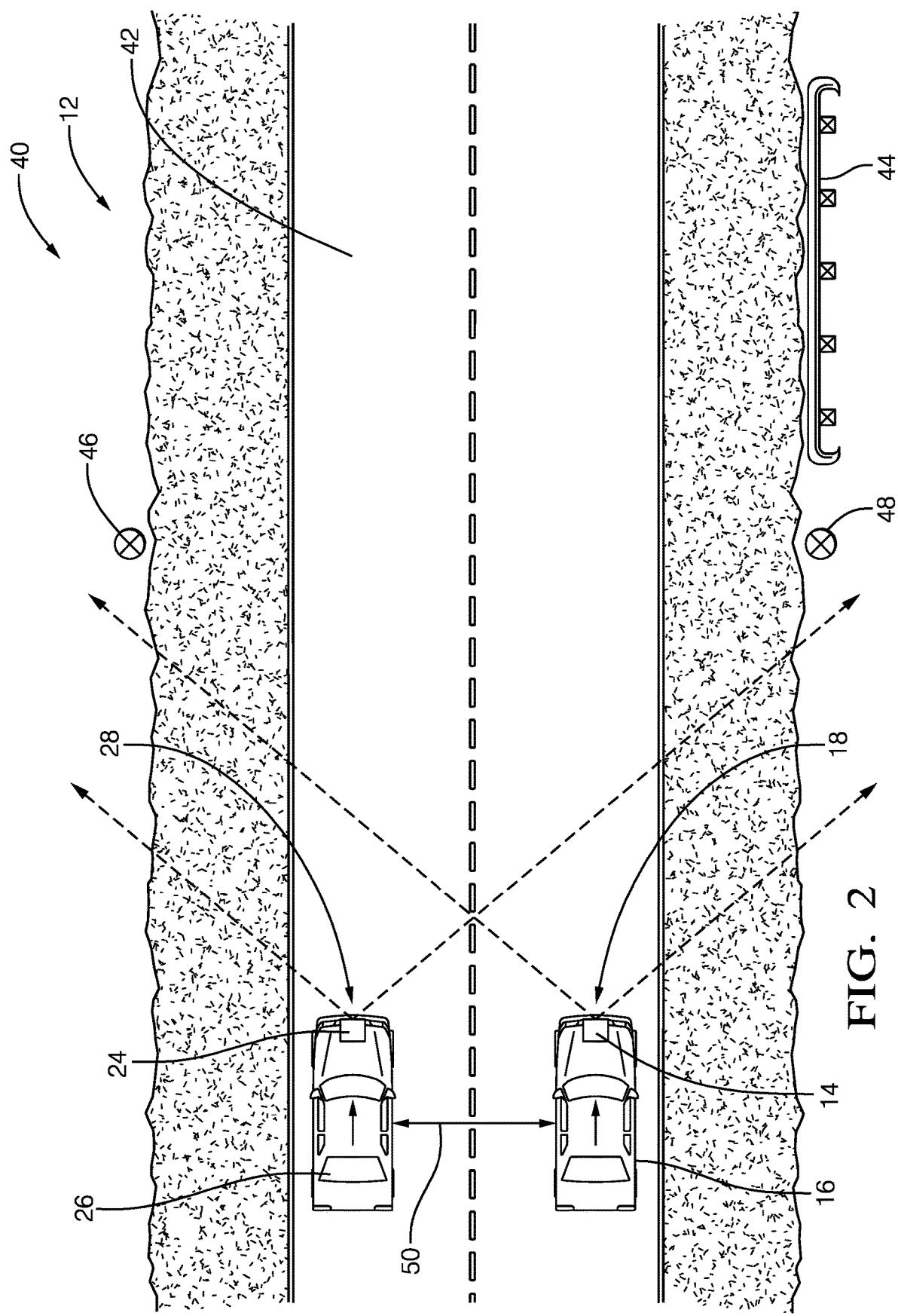
FIG. 2 is a scenario encountered by the system of FIG. 1 in accordance with one embodiment.

FIG. 2 illustrates a non-limiting example of a scenario 40 that the system 10 may encounter while mapping a non-limiting example of the area 12 that includes a roadway 42, a guardrail 44, and two instances of reference-objects 46, 48. As used herein, the reference-objects 46, 48 are objects that have well-known detection characteristic for various sensing devices such as radar, lidar, and/or camera. That is, the reference-objects 46, 48 can be any object that is readily and consistently detected by radar, lidar, and/or camera, so may have a surface treatment that readily reflects light and radar-signals, and is characterized by a known size and location.

The scenario 40 shows the first-vehicle 16 and the second-vehicle 26 traveling in the same direction but on opposite sides of the roadway 42 so the first-sensor 14 and the second-sensor 24 can simultaneously view the roadway 42 from, respectively, the first-perspective 18 and the second-perspective 28. If both the first-sensor 14 and the second-sensor 24 are equipped with cameras, then the wider apart spacing than would be possible from two cameras mounted on the same vehicle provides an autostereoscopic image of the area 12 with better depth resolution than would be the case for two cameras mounted on the same vehicle, e.g. on opposing fenders of the first-vehicle 16. The same advantage applies to the system if the first-sensor 14 and the second-sensor 24 are both equipped with distinct radar-units and/or lidar-units. While FIG. 2 shows two vehicles cooperating to gather perception-data, it is contemplated that more than two vehicles could cooperate to greater advantage to gather perception-data.

To better process the perception-data 20A, 20B, the system 10, or more specifically the controller 32 or the processor 34, should have a measure of a relative-position 50 of the first-vehicle 16 and the second-vehicle 26, e.g. the position of the first-vehicle vehicle 16 with respect to the second-vehicle, or the reverse. That is, the controller-circuit 32 is advantageously further configured to determine the composite-data 38 in accordance with (i.e. based on) the relative-position 50, e.g. based on a distance and direction from the first-vehicle 16 to the second-vehicle 26. The relative-position 50 may be measured or determined using sensors and/or based on GPS coordinates of the first-vehicle 16 and the second-vehicle 26. If sensors are used or contribute to the measurement, the relative-position 50 may be determined in accordance with (i.e. based on) one or more of: the perception-data 20A from the first-sensor 14; the perception-data 20B from the second-sensor 24; and/or position-data 52 from a third-sensor 54. While FIG. 1 shows the third-sensor 54 as being part of (i.e. mounted on) the second-vehicle 26, this is not a requirement as it is contemplated that the third-sensor 54 could be mounted on either vehicle. The third-sensor 54 may be selected to be specialized to measure distance/direction between the first-vehicle 16 and the second-vehicle 26, e.g. a narrow view lidar-unit that is well suited to measure distance and direction between the vehicles.

In one embodiment of the system 10, the second-vehicle 26 may be configured to autonomously operate to maintain a desired or predetermined value of the relative-position 50 to the first-vehicle 16. For example, the system 10 may include a transmitter 60 installed on the first-vehicle 16. The receiver 30 and the transmitter 60 may be part of a transceiver such as a dedicated-short-range-communications (DSRC) transceiver, a cellular-telephone network transceiver, or a Wi-Fi transceiver. The controller 32 may then be configured to communicate with the transmitter 60 to transmit a control-message 62 to the second-vehicle 26. The second-vehicle 26 is preferably equipped with vehicle-controls 64 that may be operated by a second controller (not shown) in the second-vehicle 26, where this second controller is configured to autonomously operate the vehicle-controls 64 in the second-vehicle 26. Accordingly, the second-vehicle 26 operates in accordance with the control-message 62 to control the relative-position 50 of the second-vehicle 26 with respect to the first-vehicle 16.

The desired value of the relative-position 50 may be fixed, or be variable to optimize the perception-data 20A, 20B for the area 12. For example, the first-vehicle 16 and the second-vehicle 26 may be advantageously further spaced-apart in a rural setting to get better information on distant objects, and closer-together in urban setting to get higher accuracy or greater overlap of the fields-of-view of the first-sensor 14 and the second-sensor 24.

To control the relative-position 50 of the second-vehicle 26 to the first-vehicle 16, the control-message 62 may include a desired-distance 66 and a desired-direction 68. As suggested above, the second-vehicle 26 may be configured to self-control in accordance with the desired-distance 66 and the desired-direction 68 included in the control-message 62. Alternatively, the control-message 62 may include information that is used to directly controls the second-vehicle. I.e.—rather than the second-vehicle 26 control itself to maintain the desired-distance 66 and the desired-direction 68, the control-message may include information that is sent directly to the vehicle-controls 64 to directly operate the steering, accelerator, and brakes of the second-vehicle 26. It is also contemplated that IMU data from first-vehicle 16 could be transmitted to second-vehicle 26 and used by second-vehicle 26 to better control the second-vehicle 26 to match the movement of the first-vehicle 16. As such, the system 10 includes an inertial-measurement-unit 70 (IMU 70) for installation on the first-vehicle 16, and the control-message 62 includes inertial-data (e.g. yaw-rate, pitch-rate, roll-rate, pitch-angle, roll-angle, yaw-angle which may be different from vehicle-heading, X-Y-Z acceleration) from the IMU 70 that is used to control the second-vehicle 26.

While the above examples suggest that the first-vehicle 16 and/or the second-vehicle 26 are fully automated, this is not a requirement. Full automation may be advantageous when mapping a roadway or some other readily identifiable driving surface. However, it is contemplated that is some situations, e.g. while mapping rugged off-road terrain, manual operating may be preferable. It is recognized that the relative-position 50 of the first-vehicle 16 and the second-vehicle 26 may not be consistent. However, the relative-position 50 may be included in the perception-data 20A, 20B so that variation in the relative-position 50 can be compensated when the composite-data 38 is determined.

In an alternative embodiment, the system 10 may use an instance of a localization-object 72 (FIG. 1) such as the guardrail 44 or the reference-objects 46, 48 that are detected by first-sensor 14 and second-sensor 24 to control the second-vehicle 26. To this end, the system 10 may include a digital-map 74 that indicates the presence of the localization-object 72. Then, the control-message 62 may include a coordinate 76 of the localization-object 72, and the second-vehicle 26 operates in accordance with the coordinate 76 of the localization-object 72.

Figure 3:
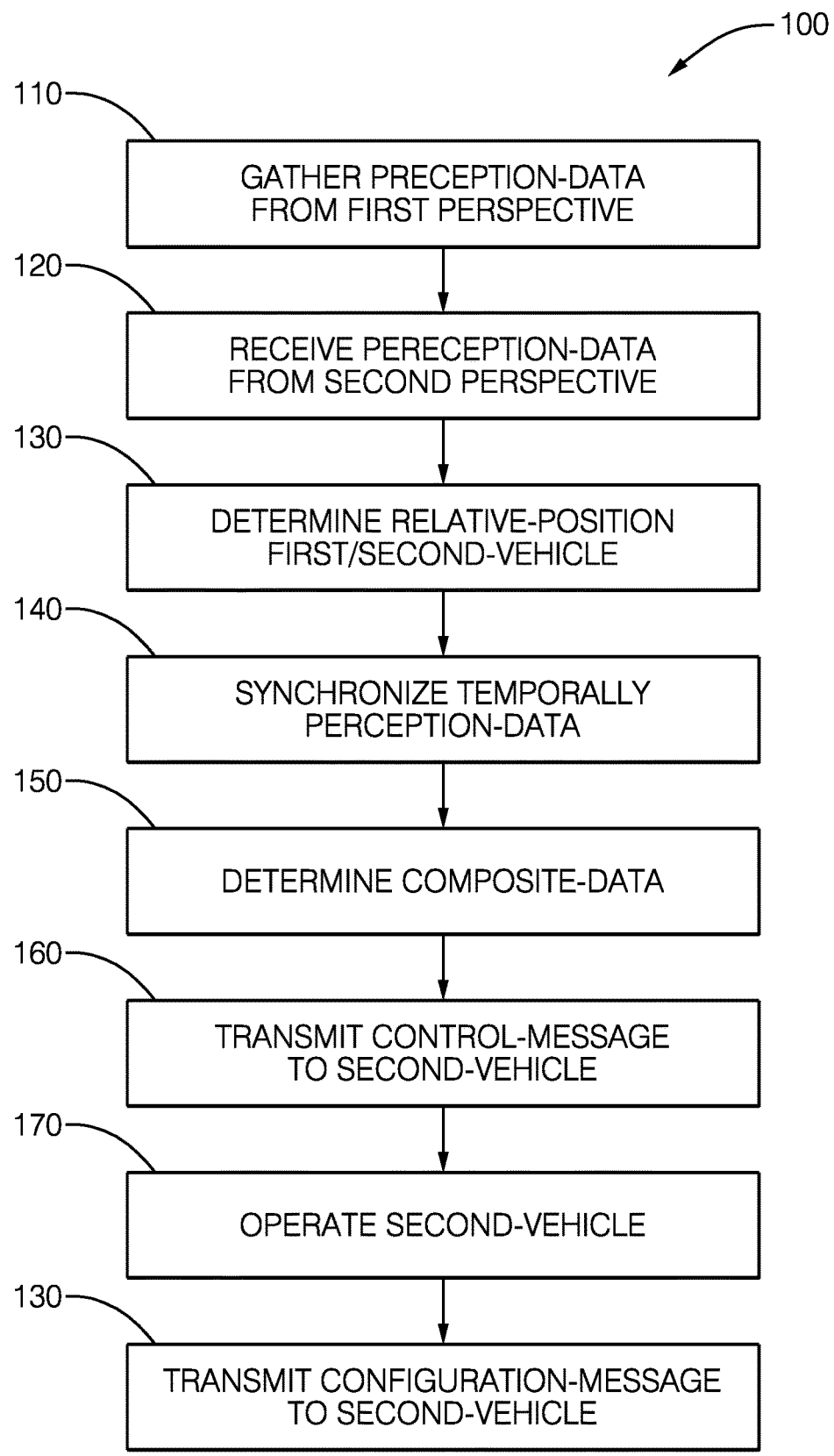
FIG. 3 is method of operating the system of FIG. 1 in accordance with one embodiment.

In addition to controlling the relative-position 50, the system 10 may be further configured to adjust/configure the second-sensor 24 on second-vehicle 26 to match or complement the configuration of the first-sensor 14 on the first-vehicle 16. To this end, the system 10 may use the transmitter 60 to transmit a configuration-message 82 as part of the control-message 62 to the second-vehicle, where configuration-message 82 includes a configuration-parameter 78 used to configure the second-sensor 24. By way of example and not limitation, the configuration-parameter 78 may include information to adjust beam shape, beam patterns, sweep frequencies, processing models, thresholds, FFT points, point cloud densities, point cloud processing, etc. of the second-sensor FIG. 3 illustrates a non-limiting example of a method 100 of operating the map-data collection system 10 for mapping the area 12.

Step 110, GATHER PERCEPTION-DATA FROM FIRST-PERSPECTIVE, may include gathering, by a first-sensor 14 of (i.e. mounted on) a first-vehicle 16, perception-data 20A, where the perception-data 20A is taken or gathered from a first-perspective 18 of an area 12. The first-sensor 14 may consist of or include, but is not limited to, one or more instances of a camera, radar unit, lidar unit, ultrasonic transducer, inertial measurement unit (IMU), or any combination thereof. The perception-data 20A may be stored for later use or analysis, so the perception-data 20A may include a time-stamp.

Step 120, RECEIVE PERCEPTION-DATA FROM SECOND-PERSPECTIVE, may include receiving, perception-data 20B transmitted from a second-sensor 24 of (i.e. mounted on) a second-vehicle 26, where the perception-data 20B is taken or gathered from a second-perspective 28 of the area 12. The second-perspective 28 is different from the first-perspective 18 so that the perception-data 20A, 20B represents two possibly partially overlapping but distinct fields-of-view.

Step 130, DETERMINE RELATIVE-POSITION FIRST/SECOND-VEHICLE, may include determining a relative-position 50 of the first-vehicle 16 and the second-vehicle vehicle 26 based on GPS-coordinates of the first-vehicle 16 and the second-vehicle 26, and/or a distance and direction from one vehicle to the other measured by a sensor mounted on one of the vehicles.

Step 140, SYNCHRONIZE TEMPORALLY PERCEPTION-DATA, may include synchronizing 80 temporally the perception-data 20A from the first-sensor 14 with the perception-data 20B from the second-sensor 24 as both the perception-data 20A and the perception-data 20B are used to determine the composite-data 38. Synchronizing may be done in real-time by simultaneously storing the perception-data 20A, 20B the instant it is available, or time-stamping the perception-data 20A, 20B so the synchronization can be done off-line or in background as processing capacity permits.

Step 150, DETERMINE COMPOSITE-DATA, may include determining, by a controller-circuit 32, the composite-data 38 in accordance with the perception-data 20A from the first-sensor 14 on the first-vehicle 16 and the perception-data 20B from the second-sensor 24 on the second-vehicle 26. The step 150 of determining the composite-data 38 may also be done in accordance with the relative-position 50 of the first-vehicle 16 and the second-vehicle 26. That is, especially if the relative-position 50 varies over time, determining the composite-data 38 may include adjusting or compensating the perception-data 20A, 20B to correct any errors caused by variation of the relative-position 50.

Step 160, TRANSMIT CONTROL-MESSAGE TO SECOND-VEHICLE, may include operating a transmitter 60 to transmit a control-message 62 to the second-vehicle 26. The control-message 62 may include commands directed to (i.e. intended for operating) the vehicle-controls 64 of the second-vehicle 26, or an indication of the relative-position 50 so the second-vehicle 26 is left to determine how to control or operate the vehicle-controls 64, or a desired-distance 66 and a desired-direction 68 where again the second-vehicle 26 is left to determine how to control or operate the vehicle-controls 64.

Step 170, OPERATE SECOND-VEHICLE, may include operating the second-vehicle 26 in accordance with the control-message 62 to control the relative-position 50 of the second-vehicle 26 with respect to the first-vehicle 16. Various ways to configure the operation are described above.

Step 180, TRANSMIT CONFIGURATION-MESSAGE TO SECOND-VEHICLE, is an optional step that may include transmitting a configuration-message 82 to the second-vehicle 26. The configuration-message 82 may include a configuration-parameter 78 used to configure the second-sensor 24.

Described herein is a first device 32 that includes one or more processors 34; memory 36; and one or more programs 100 stored in memory, the one or more programs including instructions for performing all or part of the method 100 described above. Also, described herein is a non-transitory computer-readable storage medium 36 comprising one or more programs 100 for execution by one or more processors 34 of a first device 32, the one or more programs including instructions which, when executed by the one or more processors, cause the first device to perform all or part of the method 100 described above.

Accordingly, a map-data collection system (the system 10), a controller 32 for the system 10, and a method 100 of operating the system 10 are provided. The system 10 provides for an improved means and method to collect the perception-data 20A, 20B from sensor mounted on different vehicles thereby providing multiple perspective view of the area 12.

While this invention has been described in terms of the preferred embodiments thereof, it is not intended to be so limited, but rather only to the extent set forth in the claims that follow.

We claim:

1. A system comprising:
a sensor configured to collect perception data of an area of a roadway from a perspective of a vehicle;
a receiver configured to receive other perception data of the area from another sensor mounted on another vehicle, the other perception data of the area having been collected from another perspective of the other vehicle that is different than the perspective of the vehicle;
a controller operatively connected to the sensor and the receiver, the controller configured to:
 determine, based on the perception data from the sensor and the other perception data from the other sensor, composite data that identifies one or more objects in the area; and
 generate, based on the composite data, a control message including instructions to control a relative position of the other vehicle with respect to the vehicle to optimize at least one of the perception data from the sensor or the other perception data from the other sensor; and
a transmitter configured to transmit the control message to the other vehicle.

2. The system in accordance with claim 1, wherein the perception data from the sensor and the other perception data from the other sensor used to determine the composite data are temporally synchronized.

3. The system in accordance with claim 1, wherein the controller is further configured to determine the composite data in accordance with a relative position of the vehicle with respect to the other vehicle.

4. The system in accordance with claim 3, wherein the relative position of the vehicle with respect to the other vehicle is determined in accordance with at least one of the perception data from the sensor, the other perception data from the other sensor, or position data from a third sensor.

5. The system in accordance with claim 1, wherein the control message includes a desired distance and a desired direction.

6. The system in accordance with claim 1, wherein the system includes an inertial measurement unit, and the control message includes inertial data from the inertial measurement unit that is used to control the other vehicle.

7. The system in accordance with claim 1, wherein the system includes a digital map that indicates the one or more objects in the area, the control message includes a coordinate of the one or more objects in the area to control the relative position of the other vehicle with respect to the vehicle in accordance with the one or more objects in the area.

8. The system in accordance with claim 1, wherein the controller is further configured to communicate with the transmitter to transmit a configuration message to the other vehicle, the configuration message including a configuration parameter to configure the other sensor.

9. The system of claim 1, wherein the instructions of the control message include information to operate at least one of a steering, an accelerator, or brakes of the other vehicle.

10. A controller comprising:
an input configured to receive from a sensor perception data of an area of a roadway from a perspective of a vehicle;
a receiver configured to receive other perception data of the area from another sensor mounted on another vehicle, the other perception data of the area having been collected from another perspective of the other vehicle that is different than the perspective of the vehicle;
a processor operatively connected to the input and the receiver, the processor configured to:
 determine, based on the perception data from the sensor and the other perception data from the other sensor, composite data that identifies one or more objects in the area; and
 generate, based on the composite data, a control message including instructions to control a relative position of the other vehicle with respect to the vehicle to optimize at least one of the perception data from the sensor or the other perception data from the other sensor; and
a transmitter configured to transmit the control message to the other vehicle.

11. The controller in accordance with claim 10, wherein the perception data from the sensor and the other perception data from the other sensor used to determine the composite data are temporally synchronized.

12. The controller in accordance with claim 10, wherein the processor is further configured to determine the composite data in accordance with a relative position of the vehicle with respect to the other vehicle.

13. The controller in accordance with claim 12, wherein the relative position of the vehicle with respect to the other vehicle is determined in accordance with at least perception data from the sensor, the other perception data from the other sensor, or position data from a third sensor.

14. The controller in accordance with claim 10, wherein the control message includes a desired distance and a desired direction.

15. The controller in accordance with claim 10, wherein the processor is further configured to communicate with an inertial measurement unit, and the control message includes inertial data from the inertial measurement unit that is used to control the other vehicle.

16. The controller in accordance with claim 10, wherein the processor is further configured to access a digital map that indicates the one or more objects in the area, the control message includes a coordinate of the one or more objects in the area to control the relative position of the other vehicle with respect to the vehicle in accordance with the one or more objects in the area.

17. The controller in accordance with claim 10, wherein the processor is further configured to communicate with the transmitter to transmit a configuration message to the other vehicle, the configuration message including a configuration parameter to configure the other sensor.

18. The controller of claim 10, wherein the instructions of the control message include information to operate at least one of a steering, an accelerator, or brakes of the other vehicle.

19. A method comprising:
collecting, by a sensor of a vehicle, perception data of an area of a roadway from a perspective of the vehicle;
receiving, by a receiver from another sensor mounted on another vehicle, other perception data of the area, the other perception data of the area having been collected from another perspective of the other vehicle that is different than the perspective of the vehicle;
determining, by a controller operatively connected to the sensor and the receiver, composite data that identifies one or more objects in the area, the determining based on the perception data from the sensor and the other perception data from the other sensor;

generating, by the controller and based on the composite data, a control message including instructions to control a relative position of the other vehicle with respect to the vehicle to optimize at least one of the perception data from the sensor or the other perception data from the other sensor; and transmitting, by a transmitter, the control message to the other vehicle.

20. The method in accordance with claim 19, wherein the method further comprises:

synchronizing temporally the perception data from the sensor with the other perception data from the other sensor that is used to determine the composite data.

21. The method in accordance with claim 19, wherein the method further comprises:

determining a relative position of the vehicle with respect to the other vehicle, wherein the determining of the composite data is in accordance with the relative position of the vehicle with respect to the other vehicle.

22. The method in accordance with claim 19, wherein the method further comprises:

transmitting a configuration message to the other vehicle, the configuration message including a configuration parameter to configure the other sensor.

23. The method of claim 19, wherein the instructions of the control message include information to operate at least one of a steering, an accelerator, or brakes of the other vehicle.

* * * * *